Patented Jan. 11, 1938

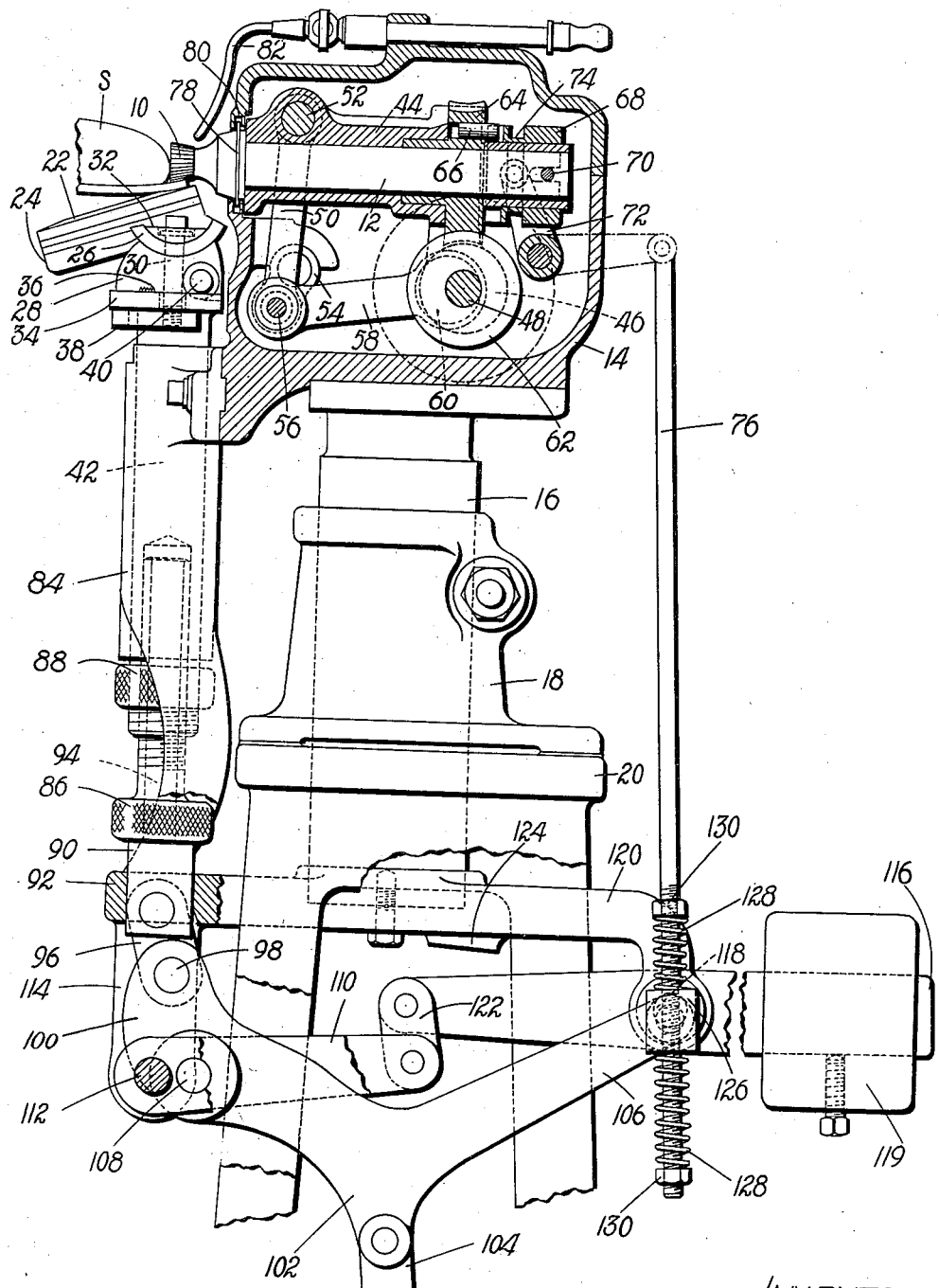

2,105,388

UNITED STATES PATENT OFFICE 2,105,388

FINISHING MACHINE

Reginald Boyd Woodcock and Hubert Boothroyd, Leicester, England, assignors to United Shoe Machinery Corporation, Paterson, N. J., a corporation of New Jersey Application December 12, 1935, Serial No. 54,123
In Great Britain January 3, 1935

14 Claims. (Cl. 12—32)

This invention relates to finishing machines and is herein illustrated with reference to a machine of the type disclosed in United States Letters Patent No. 2,048,073, granted July 21, 1936, upon an application filed in the name of Frank B. Keall.

It is recognized as desirable by those skilled in the art of indenting the upper surface of the welt of a welted shoe or the similar surface of a shoe having other-than-welt construction to cause the indenting pressure to be applied by a rapid succession of impulses of the indenting tool in addition to a steadily exerted pressure and to effect a feed movement of the shoe by continuously rotating the tool, as accomplished according to the application mentioned above. Accordingly, an important object of the present invention is to provide an improved machine having these operating characteristics and mechanism which permits, to greater advantage than has been possible heretofore, the indenting tool to be positively vibrated toward and away from the work and simultaneously rotated. One obstacle to the attainment of this object results from the difficulty of so relating the mechanisms for rotating the tool and simultaneously vibrating it that the operation of either mechanism is not affected by the other.

In view of the foregoing and according to one feature of the invention, provision is made in the illustrated machine, which includes a work rest and an indenting tool, for mounting a carrier in which the tool is rotatably supported to swing about a fixed axis, for continuously rotating the tool to impart a feed movement to a work-piece on the work rest, and for vibrating the carrier toward and away from the work rest to cause the tool to beat against the work-piece. The axis about which the tool is thus mounted to swing in the illustrated machine is that of the drive shaft and, since the swinging movement of the carrier is concentric with the shaft, continuous rotation of the tool may easily be effected, notwithstanding vibration of the carrier, by a connection between the tool shaft and the tool consisting, for example, of a worm gear associated with the tool shaft and a worm on the drive shaft.

Conveniently and as herein illustrated, the carrier is vibrated to cause the tool to beat against a work-piece on the work rest by means constituting another feature of the invention comprising a toggle which is adapted to be swung rapidly back and forth from one side of its straightened position to the other, whereby two blows are imparted by the tool against the work-piece for each complete vibration of the toggle. According to another feature of the invention, the toggle is operated in the manner described above by crank means connecting the toggle and the drive shaft referred to above. This means, in the illustrated construction, comprises a connecting rod one end of which is connected to the toggle and the other end of which embraces an eccentric on the drive shaft.

Although, as mentioned above, the indenting tool of the illustrated machine is constantly rotated during an indenting operation to impart a feed movement to the work piece upon which it is operating, another object of the invention is to make provision for controlling the rotation of the tool with regard to that movement of the work rest during which a work piece thereon is presented to the tool. To this end, the invention contemplates the provision with operator-controlled means for moving the work rest toward the tool to cause indenting pressure to be applied by the tool to the work piece on the work rest, and means for rotating the tool, of a clutch disposed normally in non-driving position, and means, actuated by the movement of the operator-controlled means, for operating the clutch to establish a driving connection between the tool and its driving means after the work piece has been moved into engagement with the tool. Insurance is thus provided against scuffing of the work by the tool at the beginning of an indenting operation since the rotation of the indenting tool is not started until after substantial indenting pressure has been set up.

These and other features of the invention will now be more fully set forth in the following specification with reference to the accompanying drawing.

The drawing shows, in side elevation and partly in section, the upper part of an improved indenting machine constructed in accordance with the invention.

The illustrated construction comprises an indenting tool 10 mounted on the forward end of a shaft 12 which is housed within a casing 14 carried on the upper part of a stem 16. The stem may be clamped in any desired position of vertical adjustment in the base of the machine, which comprises a column 18 mounted on a standard 20 having legs which stand on the floor.

A shoe S having a surface to be indented such, for example, as the upper surface of a welt, is held in engagement with the tool 10 by a support 22 which is mounted to rotate freely in a carrier 24, the carrier being mounted to tilt about a horizontal axis at the center of curvature of an arcuate guide 26 which is seated in a complementary arcuate recess in a block 28. Bolts 30, one of which is at each side of the support 22 and which have their heads seated in arcuate washers 32 shaped to fit the curvature of the guide 26, hold the work support in any desired position of angular adjustment with respect to the block 28. The bottom of the block 28 is seated upon a plate 34 and has formed therein a series of grooves 36 extending laterally of the machine any one of which grooves is adapted to receive a complemental ridge extending upwardly from the plate 34 so as to permit adjustment of the support 22 forwardly and rearwardly of the tool 10. Adjustment of the work support 22 laterally of the tool 10 may be effected by turning a screw 40 which is threaded in the block 28 and has a shoulder received in a recess in the plate 34 to hold the screw against axial movement. The bolts 30 are threaded into a clamp plate 38 beneath the plate 34 and hence not only clamp the carrier 24 against the block 28 but also hold the latter fixedly in any desired position of adjustment on the plate 34. The work support 22 and its mounting described above are carried on a vertical stem 42 which is connected to and operated by a treadle-actuated device to be described later.

The tool shaft 12 is rotatably mounted in a carrier 44 having downwardly extending lugs 46 which are bored to receive a drive shaft 48 journaled in the casing 14 laterally of the support 22 and about which the carrier 44 is thus adapted to oscillate to permit the tool 10 to be swung axially of the work rest or support 22 directly toward and away therefrom in the plane of the drawing including, or parallel to, the axis about which the work support rotates. Such swinging movement of the carrier 44 is effected in the illustrated construction by means comprising a toggle consisting of a pair of links of which one is shown at 50 the upper ends of which are connected to the carrier 44 by a pin 52 and another pair of links of which one is shown at 54 the lower ends of which are connected to the lower ends of the links 50 by a pin 56. The upper ends of the links 54 are pivoted to lugs extending inwardly from the front wall of the casing 14. The links 50, 54 thus constitute a toggle which, when moved back and forth through its straightened position, causes the tool 10 to beat against the portion of the shoe S which is presented to the tool. The toggle 50, 54 is thus operated by crank-operated means, herein illustrated as a connecting rod 58 one end of which is pivoted upon the lower ends of the links 50 and the other end of which embraces a crank or eccentric 60 on the drive shaft 48.

Provision is also made in the illustrated construction for driving the tool 10 so as to impart a feed movement to a work-piece being indented. To this end, there is mounted on the drive shaft 48 a worm 62 which meshes with a skew gear 64 rotatably mounted within the carrier 44 and on the tool shaft 12. The skew gear 64 has a pin 66 projecting from its exposed radial surface, which pin may be received within any of a number of recesses in a clutch member 68 which is free to slide axially of the tool shaft 12 but is prevented from turning with respect thereto by a pin 70 fixed in the shaft 12 and received in axially extending grooves in the clutch member 68. In order to make or interrupt the driving connection between the skew gear 64 and the tool shaft 12, the clutch member 68 is moved along the tool shaft 12 by a bell crank lever 72 one arm of which may be bifurcated and is received within a groove 74 formed in the periphery of the clutch member 68. The other arm of the bell crank 72 is connected to and operated by a rod 76 which is under the control of the treadle mechanism which is to be described later. The drive shaft 48 may conveniently be rotated at about 1500 R. P. M. and the tool shaft 12 will then be rotated at 60 R. P. M. through the worm 62 and the skew gear 64. The eccentric 60 on the drive shaft vibrates the lower ends of the toggle links 50 and 54 from one side of their straightened position to the other and back again 1500 times per minute, but since in doing so the toggle 50, 54 passes through its straightened position twice, the carrier 44, and hence the tool shaft 12 and the tool 10, are vibrated vertically 3000 times per minute. The indenting tool 10, therefore, when rotated at 60 R. P. M., will impart a rapid succession of blows to a work-piece under it at the rate of 3000 blows per minute. The casing 14 is closed and contains a substantial quantity of oil which constantly lubricates all bearing surfaces of the operating parts referred to above. On the forward end of the tool shaft 12, at the point where it emerges from the casing 14, there is provided a disk 78 which, owing to the vibration imparted to the shaft, moves within an annular recess 80 in the casing and tends to throw oil which collects on the shaft into the recess from which the oil drains back into the casing 14.

The indenting tool 10 is heated in the illustrated construction by a gas flame from a jet 82 mounted in the upper part of the casing 14, but it may be desirable to heat the tool by an electric radiant heater (not shown).

Referring now to the treadle mechanism for moving the work support 22 toward and away from the tool and for controlling the rotation of the tool, the stem 42 is mounted to slide vertically in a guide 84 bolted to the casing 14 and is arranged for vertical adjustment relatively to a supporting block 90 by a member 86 which comprises an externally threaded sleeve entering a threaded bore in the stem 42 and a hand nut portion seated on the block 90. The block 90 has an upwardly extending stem 94 about which the member 86 is freely rotatable and slides vertically within a guide 92 which is rigidly clamped against the bottom end of the stem 16.

A knurled nut 88 threaded on the lower end of the stem 42 provides an adjustable stop to limit upward movement of the stem by contacting with the lower end of the guide 84.

A toggle link 96 is pivoted to the lower end of the block 90 and is also connected by a pin 98 to one arm of a lever 100 which has another arm 102 connected to a treadle rod 104 and a third arm 106 which is connected to the rod 76 referred to above. The lever arm 100 is pivoted on a pin 108 carried by a lever 110 which is fulcrumed on a pin 112 mounted in depending extensions 114 of the guide 92 and is consequently fixed in position. The lever 110 is connected to gravitationally operated means comprising a lever 116 which is pivoted at 118 on a rearwardly directed extension 120 of the guide 92. The lever 116 is connected at one end to the lever 110 by a link 122 and is adapted to carry at the other side of its fulcrum 118 a weight 119 which may be positioned on the lever 116 at varying distances from the fulcrum 118 in order to obtain any desired gravitational resistance to lowering of the work support while the machine is in operation. A padded stop 124 extending downwardly from the bottom of the guide 92 is provided to limit the upward movement of the levers 116 and 110 under the influence of the weights when the machine is idle.

When the machine is treadled, causing the rod 104 to be raised, the lever arm 100 is swung in a counterclockwise direction about the pin 108, moving the toggle formed by the link 96 and the portion of the lever 100 between the pins 98 and 108 toward its straightened position and hence lifting the stem 42 and the work support structure carried by it. When, after moving the shoe toward the tool by thus raising the work support, the proper depth of penetration of the tool into the work is secured, further straightening of the toggle comprising the link 96 and the lever arm 100 will cause the lever 110 to yield downwardly against the gravitational effect of the weighted lever 116 which tends normally to hold the lever 110 in its uppermost position against the stop 124, and thus maintain constant the desired indenting pressure of the tool against the work regardless of variations in its thickness. After this happens, the clutch member 74, by upward movement of the rod 76 which is under the control of the lever 106, is operated to cause the tool to be rotated, thus avoiding any possibility of scuffing. In the illustrated construction, the rod 76 passes through a swivel block 126 pivotally mounted at the extreme end of the lever 106 and is arranged yieldingly to raise or lower the rod 76 through springs 128, the position of which on the shaft 76 as well as their compression can be regulated by adjustment of nuts 130.

While the operation of the illustrated machine will be understood from the foregoing, it will be summarized below. The portion of the shoe S to be indented having been placed between the tool 10 and the support 12, the operator will treadle the machine, thereby causing the lever 100 to be swung about the pin 108 in a counterclockwise direction. This movement of the lever 100 causes the toggle, including the link 96, to be moved toward its straightened position and the shoe on the work support 22 to be moved into engagement with the tool. The position of the upper spring 128 will have been so adjusted on the rod 76 with reference to the swivel block 126 as to cause the clutch member 74 to be moved into driving engagement with the skew gear 64 as soon as a substantial indenting pressure has been set up between the tool 10 and the work. During such movement of the clutch member 74 and as a result of further movement of the lever 100, the indenting pressure of the tool against the work will be built up to the desired extent without any substantial upward movement of the work support, and rotative movement of the lever 100 about the pin 108 in excess of that required to set up the desired indenting pressure causes the lever 110 to be swung downwardly about its fulcrum 112, thereby causing the weighted right-hand arm of the lever 116 to be raised in opposition to the effect of gravity. It will now be apparent that any desired amount of indenting pressure can be obtained in the use of the illustrated machine merely by varying the size or position of the weight 119 on the lever 116. Furthermore, since the indenting pressure of the indenting tool is set up by the gravitational effect of a weighted member which is free to swing substantially in a state of equilibrium as variations in the thickness of the sole are encountered, uniformity in the indenting pressure at all points of the work-piece is insured.

Moreover, since the beginning of the rotary movement of the indenting tool which causes a feed movement to be imparted to the work-piece always follows the application of adequate indenting pressure, any possibility of the tool scuffing the shoe is avoided.

Having thus described our invention, what we claim as new and desire to secure by Letters Patent of the United States is:

1. In an indenting machine, a work rest, an indenting tool, a drive shaft, a carrier for said tool, said carrier being mounted on said drive shaft to swing toward and away from said work rest, means for rotating the tool to impart a feed movement to a work-piece on said work rest, and means for vibrating the carrier toward and away from the work rest to cause the tool to beat against the work-piece.

2. In an indenting machine, a work rest, an indenting tool, a carrier in which said tool is rotatably mounted, said carrier being mounted to swing toward and away from the work rest, means for continuously rotating the indenting tool to impart a feed movement to a work-piece presented thereto on said work rest, and a toggle mechanism for vibrating said carrier.

3. In an indenting machine, a work rest, an indenting tool, a drive shaft, a carrier rotatably supporting said indenting tool and mounted on said drive shaft to permit said tool to swing directly toward and away from said work rest, a toggle mechanism operated from said drive shaft for vibrating said carrier toward and away from the work rest, and connections between said drive shaft and said indenting tool for rotating the tool as it is vibrated.

4. In an indenting machine, a work rest, an indenting tool, a carrier for said indenting tool and means for operating said carrier to move the tool toward and away from said rest in a direction substantially normal thereto, said means comprising a toggle, and means for straightening and collapsing said toggle in rapid succession thereby to cause said tool to beat against a work-piece on said work rest.

5. In an indenting machine, a work rest, an indenting tool, a shaft on which said tool is mounted, a drive shaft, a carrier for said tool shaft mounted to swing about the axis of said drive shaft, said tool shaft being rotatably supported by said carrier, means for swinging said carrier to cause said tool to beat against a work-piece on said work rest, and means for constantly rotating the tool as it is vibrated comprising a gear associated with said tool shaft and a worm on said drive shaft adapted to mesh with said gear.

6. In an indenting machine, a work rest, an indenting tool, a drive shaft, a carrier mounted to swing about the axis of said drive shaft toward and away from the work rest, a shaft on which said tool is mounted rotatably supported by said carrier, means for vibrating said carrier about the axis of said drive shaft, a gear mounted to rotate freely with respect to said tool shaft, a worm meshing with said gear and mounted on said drive shaft, and a clutch carried by said tool shaft in non-turning relation therewith mounted for movement into and out of driving engagement with said gear.

7. In an indenting machine, a work rest, an indenting tool, a carrier in which said tool is rotatably mounted, a drive shaft rotatably supporting said carrier, means for vibrating said carrier about said drive shaft toward and away from the work rest to cause the tool to beat against a work-piece on said work rest, and connections between said tool and said drive shaft for rotating said tool to impart a feed movement to the work-piece.

8. In an indenting machine, a rotatable work rest, an indenting tool, a carrier supporting said tool, said carrier being mounted for swinging movement about an axis positioned laterally of said work rest to carry said tool toward and away from the work rest axially thereof, and a toggle mechanism for vibrating said carrier about said axis to cause said tool to beat against a work-piece on said work rest.

9. In an indenting machine, a frame, a rotatable work rest thereon, an indenting tool, a carrier for said tool, said carrier being pivoted on the frame to swing said tool axially of said work rest, means for vibrating said carrier toward and away from the work rest comprising a toggle, and means for rapidly moving said toggle back and forth from one side of its straightened position to the other thereby to cause said tool to beat against a work-piece on said work rest.

10. In an indenting machine, a work rest, an indenting wheel, a carrier rotatably supporting said wheel, a drive shaft, said carrier being mounted on said drive shaft to permit said wheel to swing toward and away from the work rest, means for vibrating said carrier comprising a toggle adapted to be moved back and forth from one side of its straightened position to the other, and crank-operated means connecting said drive shaft and toggle.

11. In an indenting machine, a work rest, an indenting tool, a drive shaft, a carrier rotatably supporting said indenting tool and mounted on said drive shaft to permit said tool to swing toward and away from said work rest, a toggle-mechanism connected to said carrier, and means operated from said drive shaft for moving said toggle back and forth through its straightened position thereby to cause said tool to impart a succession of blows to a work-piece on said work rest.

12. In an indenting machine, an indenting tool, means for rotating said indenting tool to impart a feed movement to a work-piece in engagement with the tool, said means comprising a clutch disposed normally in non-driving position, a work rest mounted for movement toward and away from the tool, operator-controlled means constructed and arranged successively to move the work rest toward the tool to cause the tool to exert an indenting pressure on a work-piece on said work rest and then to move said clutch into its driving position to cause said tool to be rotated, and a yielding support for said operator controlled means constructed and arranged to maintain a substantially constant indenting pressure during the said movement of the clutch.

13. In an indenting machine, an indenting tool, a work rest movable toward the tool to set up an indenting pressure, a yielding support for said means comprising a weighted member arranged gravitationally to maintain the indenting pressure constant, means for rotating said tool comprising a clutch, and means constructed and arranged successively to move said work rest toward said tool and to operate said clutch to establish a driving connection between said tool and said means for rotating the tool.

14. In an indenting machine, an indenting tool, a work rest mounted for movement toward and away from the tool, operator-controlled means for moving said work rest toward the tool to cause indenting pressure to be applied to a work-piece therebetween, a support for said operator-controlled means comprising a weighted lever arranged to yield when a predetermined indenting pressure has been set up, means for rotating said tool comprising a clutch, and means actuated by movement of said operator-controlled means for operating said clutch to establish a driving connection between said tool and said means for driving the tool after the work piece has been moved into engagement with the tool.

REGINALD BOYD WOODCOCK.
HUBERT BOOTHROYD.